March 15, 1949.　　　F. L. MOSELEY　　　2,464,708
AUTOMATIC RECORDER

Filed Jan. 5, 1944　　　　　　　　　　　　　　6 Sheets-Sheet 1

INVENTOR
FRANCIS L. MOSELEY
BY Paul B. Hunter
ATTORNEY

March 15, 1949.　　　　F. L. MOSELEY　　　　2,464,708
AUTOMATIC RECORDER

Filed Jan. 5, 1944　　　　　　　　　　　　　6 Sheets-Sheet 2

INVENTOR
FRANCIS L. MOSELEY
BY
Paul B. Hunter
ATTORNEY

March 15, 1949.  F. L. MOSELEY  2,464,708
AUTOMATIC RECORDER
Filed Jan. 5, 1944   6 Sheets-Sheet 3

INVENTOR
FRANCIS L. MOSELEY
BY Paul B. Hunter
ATTORNEY

March 15, 1949.　　　　F. L. MOSELEY　　　　2,464,708
AUTOMATIC RECORDER

Filed Jan. 5, 1944　　　　　　　　　　　　　6 Sheets-Sheet 4

INVENTOR
FRANCIS L. MOSELEY
BY Paul B. Hunter
ATTORNEY

INVENTOR
FRANCIS L. MOSELEY
BY
ATTORNEY

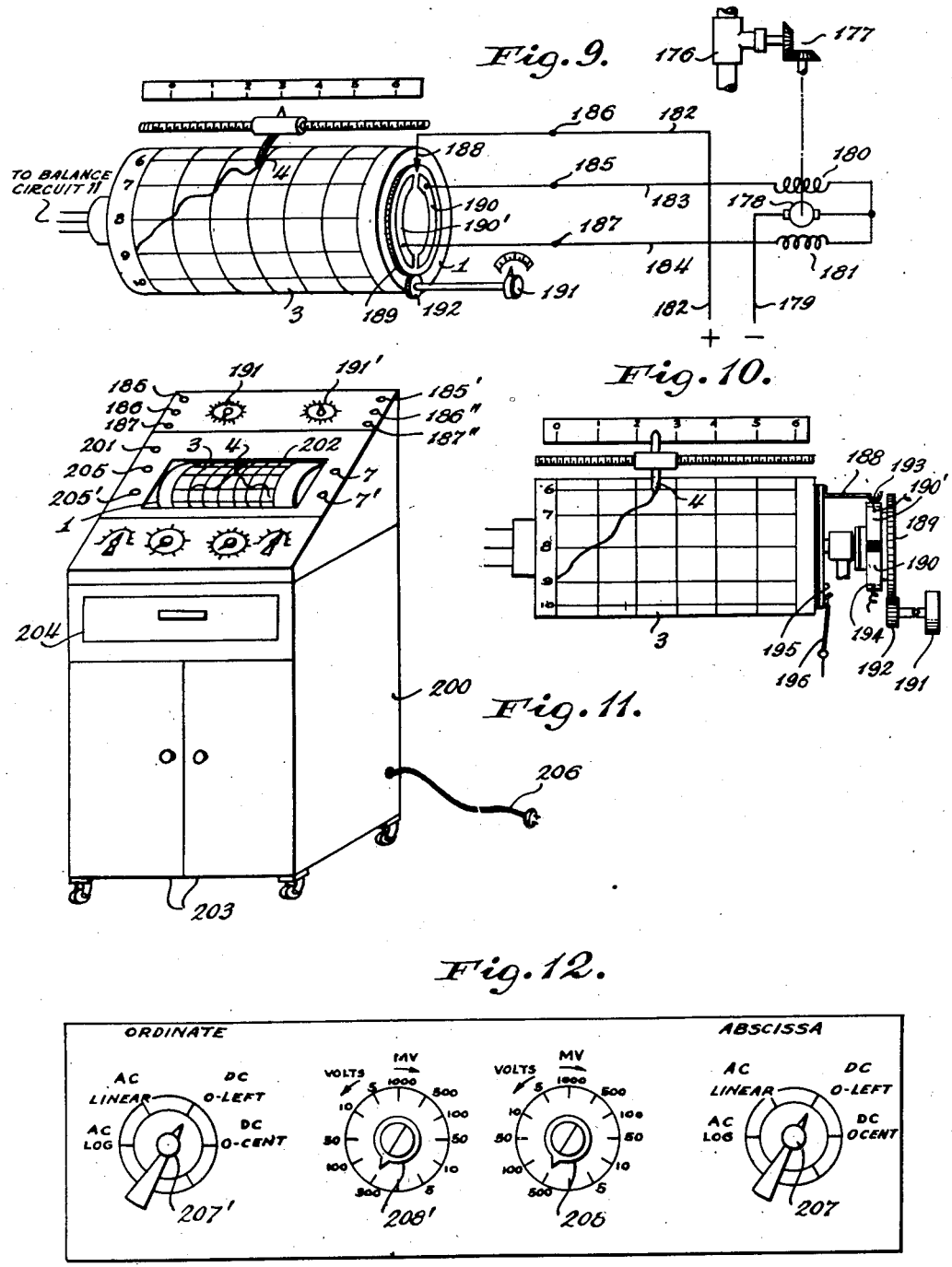

Patented Mar. 15, 1949

2,464,708

UNITED STATES PATENT OFFICE 2,464,708

AUTOMATIC RECORDER

Francis L. Moseley, Osborn, Ohio, assignor to Collins Radio Company, Cedar Rapids, Iowa, a corporation of Iowa Application January 5, 1944, Serial No. 517,003

2 Claims. (Cl. 346—32)

The present invention relates to the art of remote positional control and, more particularly, to the branch of that art which is concerned with means for, and methods of, automatically recording any physical condition, or measurable quantity, such as temperature, pressure, speed, torque, horsepower, voltage, current, and so forth.

The automatic recorder of the present invention is of the electrical potentiometer type wherein the condition or quantity is first transformed into a corresponding electrical voltage which is then employed as the control voltage for a closed servo system which operates to proportionately position a recording member. A repeat back is provided for the servo system by a potentiometer unit, the movable contact arm of which is directly actuated by the recording member to produce a repeat back voltage signal for comparison with the original input signal.

A feature of the present invention is the provision of two such recording systems, one operative to position a pen and the other simultaneously operative to position the recording paper in a perpendicular direction to the motion of the pen. By such apparatus, it is possible to plot one condition or quantity against another condition or quantity to thereby obtain a graphic representation of the relationship between the two.

Another feature of the invention is the provision of a complete self-contained recording instrument which by a simple adjustment can be adapted to receive either D. C. or A. C. signals, and if D. C., to plot the signal either from a zero center or a zero left position on the paper, and if A. C., to plot the signal either linearly or logarithmically.

Various improvements have been disclosed for obtaining an accurate recording both from very low values of signal voltage and from signal voltages which are changing rapidly with time. Novel accessory apparatus is also disclosed, whereby the recorder may also be employed for the purpose of providing a signal voltage operable upon an external servo system to maintain the condition or quantity being recorded at a predetermined value set at the recorder. Various applications of the recorder to problems encountered in practice are also disclosed.

Accordingly it is the primary object of the present invention to provide novel and improved automatic recording apparatus.

Another object is to provide apparatus for simultaneously and automatically recording two conditions or quantities, one as the ordinate and the other as the abscissa, to thereby obtain a curve of one quantity plotted against the other.

Still another object is to provide an automatic recorder adapted to selectively operate in response to either A. C. or D. C. signals.

Still another object of the invention is to provide an automatic recorder adapted to selectively record the received signals either linearly or logarithmically.

Another object is to provide an automatic recorder adapted to selectively operate either from a zero center or a zero left position on the recording paper.

Still another object is to provide an extremely accurate and non-hunting positional control system.

A further object of the invention is to provide a novel rate circuit for use in positional control systems.

A still further object is to provide improved apparatus for converting a D. C. signal into an A. C. signal proportional in magnitude and corresponding in phase to the magnitude and polarity of the D. C. signal.

An object of the invention is to provide, in an automatic recorder, accessory apparatus for maintaining an external condition at a desired value.

Another object is to provide apparatus for automatically obtaining curves of apparatus characteristics, such as gain-frequency curves of an electrical network, speed-torque curves of an engine or motor, plate current-grid bias curves of a vacuum tube, and so forth.

Other objects and advantages will become apparent from the specification, taken in connection with the accompanying drawings wherein the invention is embodied in concrete form.

Figure 8:
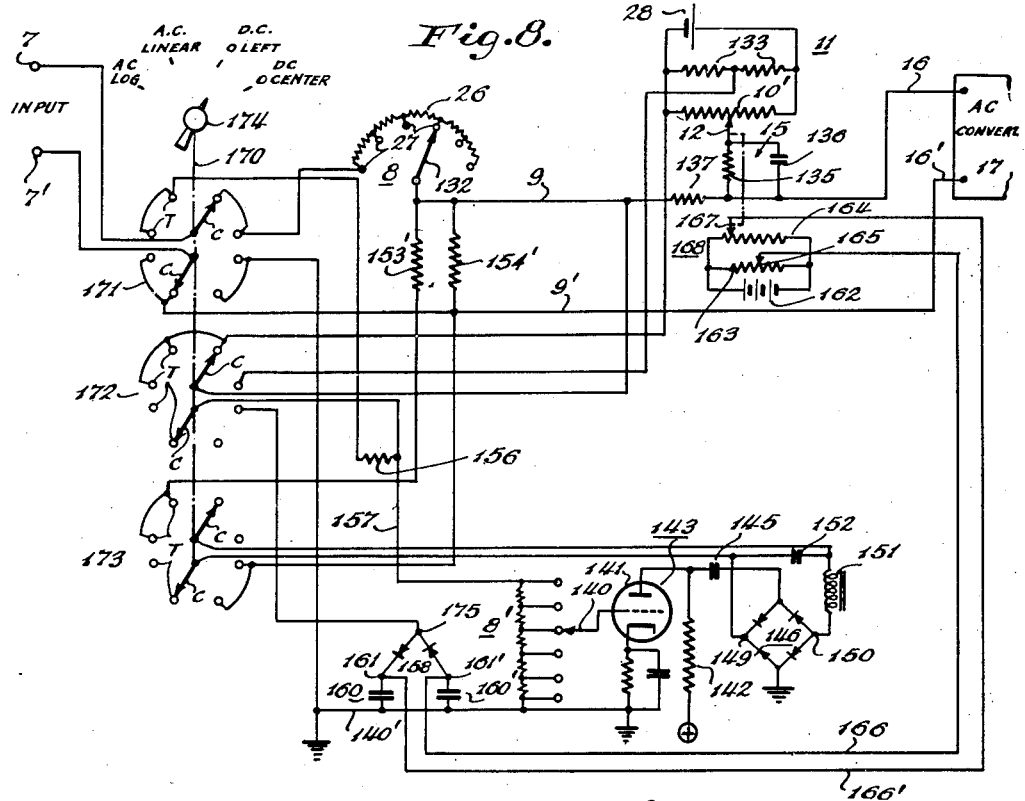

Fig. 8 is a detailed wiring diagram of an automatic recorder adapted to selectively operate upon a "D. C. zero-center," "D. C. zero-left," "A. C. linear," or "A. C. logarithmic" basis, and including switching for connecting the various portions of the apparatus to obtain the desired mode of operation.

Fig. 9 is a perspective view and wiring diagram of apparatus to be associated with the recorder in order to control an external condition or operation.

Fig. 10 is a front elevation view of the apparatus of Fig. 9.

Fig. 11 is a perspective external view of the automatic recorder chassis.

Fig. 12 is an enlarged view of the control panel shown in Fig. 11.

Figure 13:
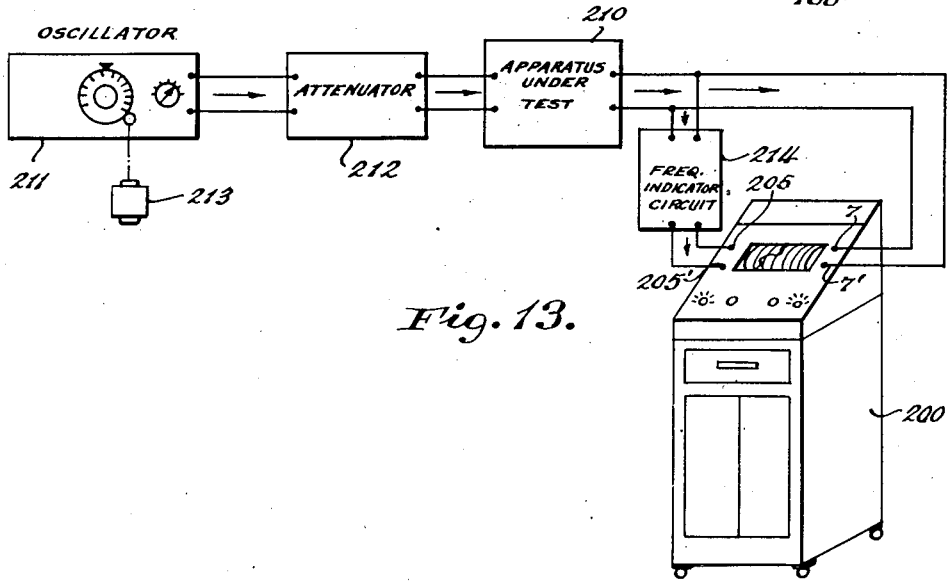

Fig. 13 is a schematic block diagram of a set-up for obtaining the frequency response curves of an electrical network.

Figure 14:
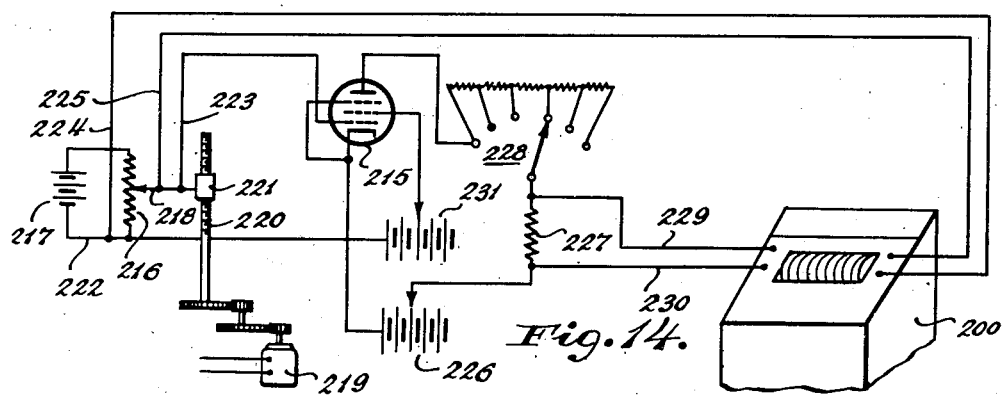

Fig. 14 is a wiring diagram of a set-up for obtaining the plate current-grid bias curves of a vacuum tube.

Figure 15:
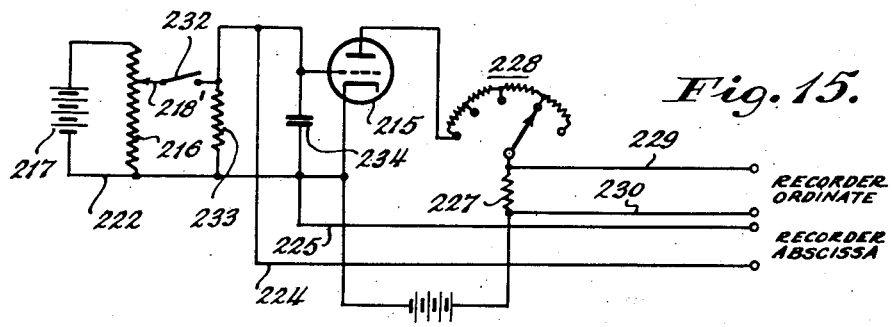

Fig. 15 is a modified form of Fig. 14.

Figure 16:
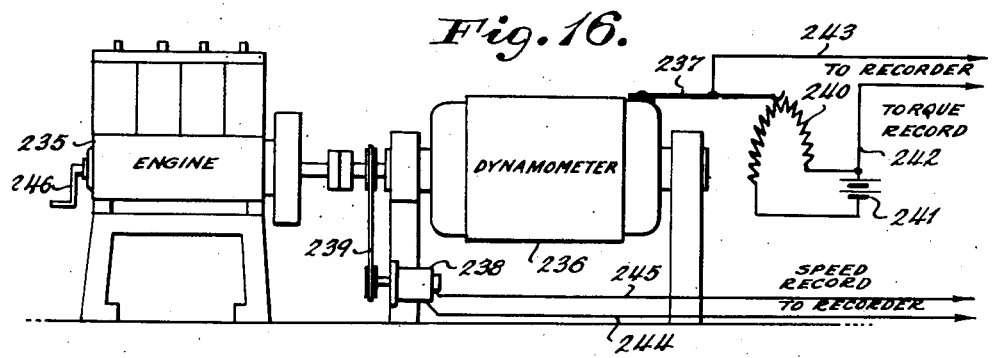

Fig. 16 is in an illustration of a set-up for obtaining the speed-torque curves of an engine or motor.

Similar characters of reference are used in all of the above figures to indicate corresponding parts.

Figure 1:
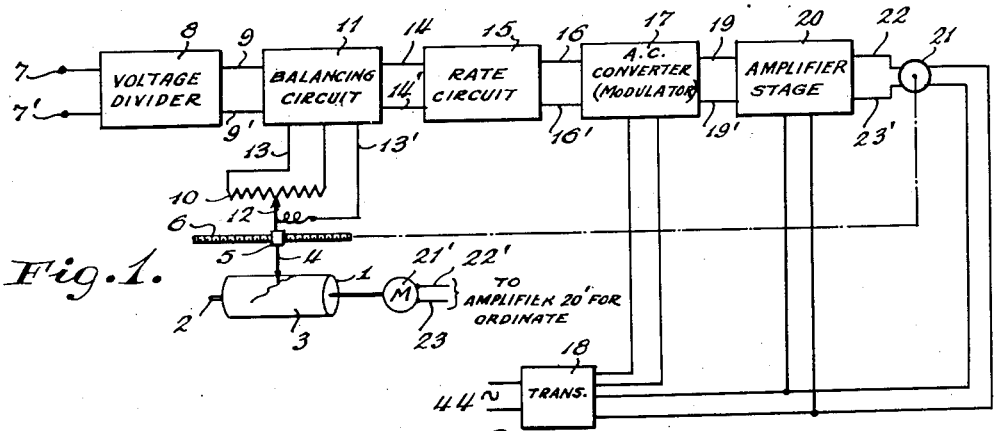
Fig. 1 is a schematic block diagram illustrating the control in one coordinate of the automatic recorder of the present invention.

Referring now to Fig. 1, wherein there is schematically shown apparatus consisting of a control circuit and servomotor means for controlling one coordinate of the two axes recorder of the present invention, 1 denotes a drum rotatable about an axis 2. Recording graph paper 3, upon which the resultant plot is to be obtained, is rolled around and suitably fastened to the drum. A suitable pen indicated schematically at 4 makes contact with the graph paper 3. The pen 4 is supported by a nut 5 which engages lead screw 6 and is moved in the direction of axis 2 upon rotation of the screw 6. Accordingly, the point of contact of the pen on graph paper 3 will at all times be determined in one direction by the lateral displacement of the pen and in the other direction by the angular displacement of drum 1 about axis 2.

One input variable voltage signal, representing one external condition or quantity, is received on input terminals 7, 7' of the control circuit which operates to proportionately control the lateral displacement of pen 4. The other input variable voltage, representing a second external condition or quantity, is similarly received on similar input terminals (not shown) of a similar control circuit which operates to proportionately control the angular displacement of drum 1 about its rotational axis. In this way a continuous curve is formed on graph paper 3 of one input variable plotted against the other input variable.

In order to continuously displace pen 4 by an amount proportional to one input variable voltage, received on input terminals 7, 7', an efficient non-lagging and anti-hunting control circuit and servo, or positional control means is employed. The input voltage, which for the present will be assumed to be a direct voltage, is first applied to a voltage divider 8 which may be adjusted, as will later be explained in detail, to reduce the magnitude of the input voltage to a magnitude within the range of voltages for which the remaining portion of the system is designed.

The purpose of the voltage divider is similar to an ammeter shunt, that is, to enable the recording system to be operated from input voltages of varying degrees of magnitude.

The output of the voltage divider is applied to a balancing circuit 11, as shown, on leads 9, 9'. A constant source of direct voltage within the balancing circuit is connected to a potentiometer 10, the movable contact arm 12 of which is controlled by the nut 5 so as to be continuously displaced from its left-most position by an amount equal to that of the pen 4. Accordingly, the potential of contact arm 12 with respect to the left side of potentiometer 10 is a measure of the instantaneous lateral displacement of pen 4. This potential is received, as on leads 13, 13' in balancing circuit 11, and is placed in series opposition with the input voltage received on leads 9, 9'.

The output voltage of balancing circuit 11, appearing on leads 14, 14', thus represents the difference between the input voltage, received on leads 9, 9', and a voltage proportional to the position of pen 4, received on leads 13 and 13'. It will be apparent that the existence of such a difference voltage on output leads 14, 14' will represent in magnitude and polarity the instantaneous error in the lateral position of pen 4. This difference voltage is therefore employed to reposition pen 4 to a position exactly corresponding to the input voltage signal.

The difference voltage is modified in the rate circuit 15 by a voltage proportional to the rate of change of this difference voltage. The purpose of the rate circuit 15 is to prevent hunting and lag in the operation of the servo system. The rate circuit operates to produce across its output leads 16, 16' a voltage proportional to the sum of the difference voltage received on leads 14, 14' and a voltage proportional to the rate of change of this difference voltage, i. e., the differential of this difference voltage with respect to time.

The voltage appearing across leads 16, 16', which will hereafter be referred to as the servo D. C. signal voltage, is introduced into the A. C. converter or modulator 17, which is energized from a constant source of alternating current from transformer 18, and which is adapted to produce across its output leads 19, 19' an alternating voltage responsive in magnitude and corresponding in phase to the magnitude and polarity of the direct signal voltage received on leads 16, 16'.

An amplifier stage 20 is shown provided in order to raise the voltage received on leads 19, 19' to a level sufficient to energize one field winding of a two-phase alternating current motor 21, as on leads 22, 23. The other winding of motor 21 is constantly energized from transformer source 18. Accordingly motor 21 will rotate in a direction corresponding to the phase of the signal voltage appearing across leads 22, 23, and therefore corresponding to the polarity of the signal voltage appearing across leads 16, 16'.

Motor 21 is schematically shown as actuating the lead screw 6 to thereby reposition the pen 4 and potentiometer contact arm 12. It will be apparent that whenever a difference voltage exists across leads 14, 14', motor 21 will be energized and will operate to move pen 4 and contact arm 12 in such a direction as to reduce the difference voltage to zero. When a difference voltage no longer exists, then the voltage across leads 13, 13', which is proportional to the lateral displacement of pen 4, must be equal to the input voltage appearing across leads 9, 9', and therefore the position of pen 4 must be proportional to the input variable voltage received on terminal 7, 7', the proportionality factor being determined by the setting of voltage divider 8.

Identical apparatus to that just described for controlling the lateral displacement of pen 4 in accordance with one input variable voltage is adapted to be provided in order to control the angular displacement of drum 1 in accordance with the other input variable voltage. The control motor 21' which actuates the drum 1 is shown as energized from a voltage received on leads 22', 23' from an amplifier 20' which corresponds to amplifier 20 for the other coordinate.

Figure 2:
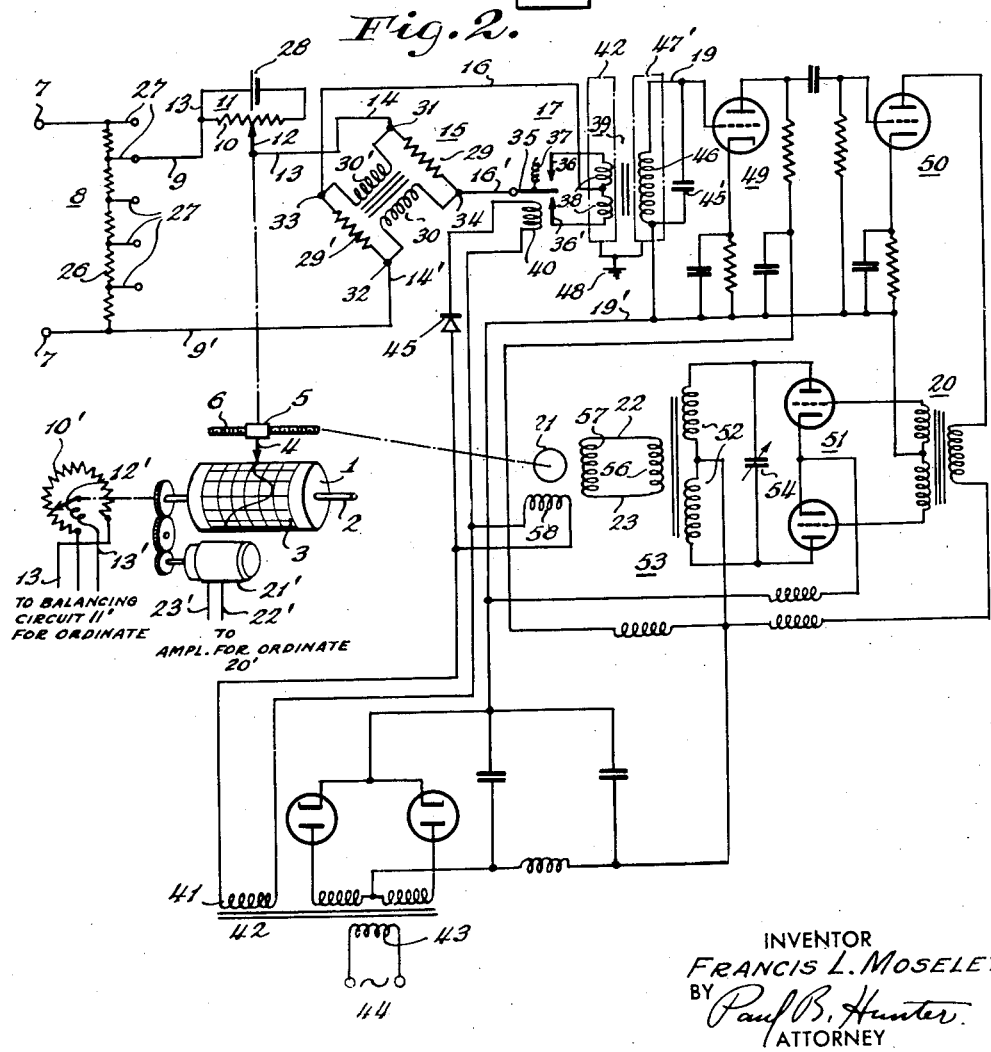
Fig. 2 is a detailed wiring diagram of the apparatus of Fig. 1.

Referring now to Fig. 2, which shows a circuit diagram of the two axes recording system of the present invention and discloses the details and connections of the various components of the system shown in block form in Fig. 1, the voltage divider 8 comprises a resistor 26 across which the direct input variable voltage, which is applied to terminal 7, 7', is directly connected. Resistor 26 has a plurality of taps 27, shown for illustration as 5 in number, to any one of which lead 9 may be connected. The resistor 26 is so graduated that known percentages of the input variable voltage may thus be tapped off between lead 9 and lead 9' which is connected to one side of resistor 26. A sensitivity setting knob (not shown in Fig. 2) is provided, the setting of which determines the particular tap to which lead 9 is connected. Thus, by adjusting the sensitivity setting knob, the scale factor, that is, the input voltage required for full scale deflection, which will appear on the graph paper 3 of drum 1 is determined. In this way the system can be adapted to various magnitudes of input voltages ranging say, from 5 millivolts to 500 volts.

Balancing circuit 11 comprises a constant source of direct current, shown as battery 28, which is applied directly across a linearly wound resistor 10 of a potentiometer unit. The movable contact arm 12 is positioned along resistor 10 in accordance with the lateral position of pen 4 on graph paper 3. It will be apparent, therefore, that a voltage is developed between the left-hand terminal of resistor 10 and the contact arm 12 proportional to the displacement of pen 4 from its left-most position. This voltage is placed in series opposition with the voltage appearing across leads 9, 9' by connecting lead 9 to the left-most terminal of resistor 10 to thereby obtain the difference voltage across the output leads 14, 14' of balancing circuit 11.

Rate circuit 15 comprises a bridge circuit consisting of identical resistors 29, 29' and identical inductive windings 30, 30'. Inductors 30, 30' preferably have over-lapping magnetic fields to provide mutual inductance therebetween and may, for example, simply be the primary and secondary windings of a one to one transformer. Input leads 14, 14', across which the difference voltage appears, are connected to points 31, 32, intermediate resistor 29 and inductor 30', and resistor 29' and inductor 30, respectively. The output leads 16, 16', across which it is desired to obtain a voltage proportional to the difference voltage and having an added component proportional to the rate of change of the difference voltage, are connected to the remaining points 33 and 34 of the bridge circuit. Inductors 30, 30' are designed to have an ohmic resistance slightly greater than that of resistors 29, 29'.

It will be apparent that if inductors 30, 30' had exactly the same resistance as resistors 29, 29', points 33 and 34 would be at the same potential upon the application of the constant difference voltage across points 31, 32. However, should resistors 29 and 29' have a negligible resistance compared to that of the inductors 30, 30', it will be seen that point 33 would be at substantially the same potential as input lead 14', whereas point 34 would be at substantially the same potential as input lead 14. In such a case, the voltage appearing across output leads 16, 16' would be substantially the same as that appearing across input leads 14, 14', this condition representing 100 percent transmission through the bridge circuit. It will be apparent therefore that by making the resistance of inductors 30, 30' slightly greater than that of resistors 29, 29' an output voltage will be obtained across leads 16, 16' which is proportional to, but less than, the input voltage appearing across leads 14, 14'. Preferably the bridge circuit is designed such that there is, for example, a 10 percent transmission through the bridge, that is, the output voltage is always 10 percent of a constant input voltage.

The above description of the operation of the bridge circuit refers only to the steady state condition when the difference voltage appearing across leads 14, 14' is constant. It will be apparent that if the difference voltage appearing across leads 14, 14' is increasing, the reactance to the low frequency alternating current due to the changing difference voltage becomes appreciable, with the result that a greater output voltage is produced across leads 16, 16', the increase representing a component proportional to the rate of change of the difference voltage, that is, the differential of this difference voltage with respect to time. Thus the elements 29, 29', 30 and 30' constitute in effect a Wheatstone bridge. Each parallel arm of this bridge which is connected to a pair of conjugate points therefore includes an inductance, for example inductance 30, which is coupled for transformer action with the other inductance 30'.

Should the difference voltage be decreasing in magnitude the stored energy in the magnetic circuit of inductors 30, 30' causes voltages to be generated in a direction to maintain the original direction of current flow. This voltage, being internally generated, is in opposition to the applied voltage and can be considered as caused by a decrease in the effective ohmic resistance of inductors 30, 30'. Accordingly, the transmission efficiency of the bridge circuit in this case will be reduced, thus decreasing the output voltage appearing across leads 16, 16', the decrease representing a negative component due to the rate of change of the difference voltage in a negative direction. Obviously if the rate of change of the difference voltage in the negative direction is of sufficient magnitude, the effective ohmic resistance of inductors 30, 30' may become less than that of resistors 29, 29', in which case the output voltage appearing across leads 16, 16' will reverse and actually be opposite in polarity to that of the difference voltage appearing across leads 14, 14'. This is a desirable result in assuring accurate operation of the servo system, as will later be shown. The effect of the mutual inductance between inductors 30, 30' is to increase the sensitivity of the bridge circuit to any rate of change of the difference voltage. Obviously close attention must be paid to the connections of inductors 30, 30' so as to cause the transformer effect to be additive to the single coil inductive effect.

In the A. C. converter 17 one input lead 16' is connected to one side of a vibrating conductive reed 35 which is normally held against the upper of a pair of contacts 36, 36' by a suitable spring 37. The other input lead 16 is connected to the center tap of the primary winding 38 of a transformer 39, the opposing terminals of which winding are electrically connected to contacts 36, 36', respectively.

Element 35 is schematically indicated as being vibrated by the magnetic field generated in a coil 40. One secondary winding 41 of a transformer 42, the primary winding 43 of which is energized by a constant source of alternating voltage, indicated at 44, energizes coil 40 through a half wave rectifier, schematically indicated at 45. In this way, periodic pulses of voltage of the same polarity are applied to coil 40 at the rate of 60 cycles per second and operate to move reed 35 downward against the restraining influence of spring 37 to thereby make contact with contact 36'. In the intervals between pulses the spring causes reed 35 to make contact with contact 36. Thus reed 35 is caused to oscillate between contacts 36, 36' at the rate of 60 cycles per second, and the direct servo signal voltage received on leads 16, 16' is thereby applied to alternate halves of primary winding 38, first in one direction and then in the other, at the rate of 60 cycles per second.

A condenser 45' is connected across the terminals of the secondary winding 46 of transformer 39, and this parallel circuit arrangement is tuned to the 60 cycle frequency of the source. It will be apparent therefore that an alternating voltage will be produced across output leads 19, 19', which are connected to the output of transformer 39, of a magnitude proportional to the direct servo signal voltage appearing across leads 16, 16', and of a phase corresponding to the polarity of the direct servo signal voltage.

Figure 5:
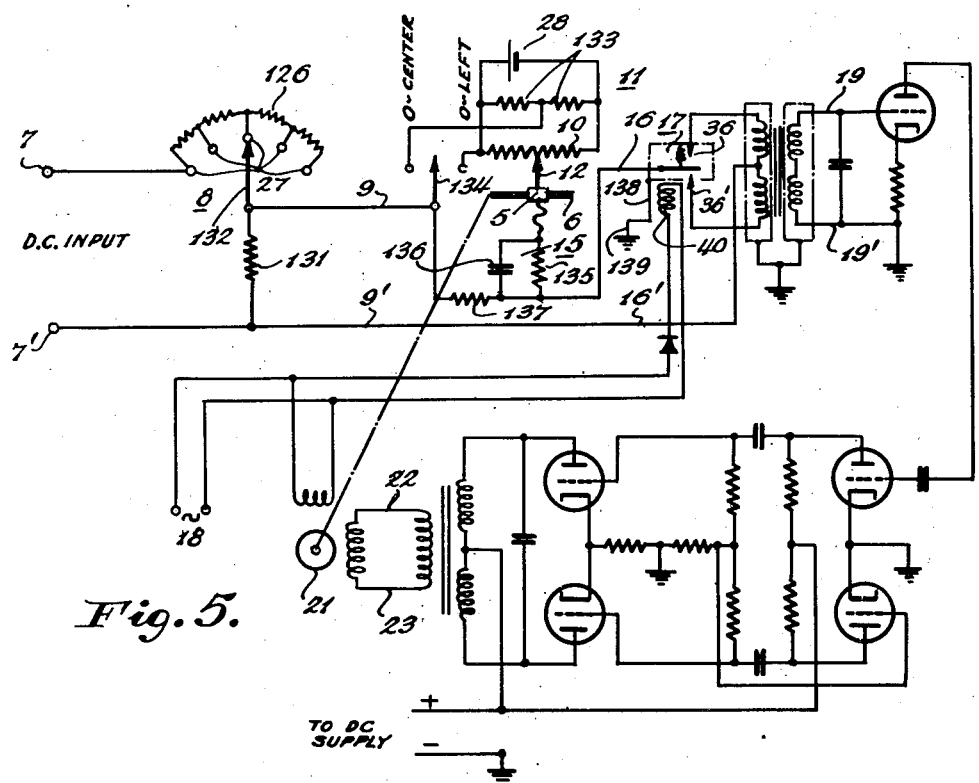
Fig. 5 is a wiring diagram of a modified form of the automatic recorder, also including provisions for selectively operating from a zero center or zero left position.

There will be a tendency for various harmonics of the 60 cycle frequency to be picked up by the secondary winding 46 and to appear across output leads 19, 19'. This tendency may be minimized by encasing the transformer 39 in a multi-layer shield formed of magnetic material of high permeability. Still further reduction of unwanted signals may be secured by completely shielding the secondary 46 of the transformer from its primary 38. This is done by the use of well-designed completely enclosed electrostatic shields, schematically indicated at 47, 47', both of which are grounded at 48. In this way longitudinal currents, which would otherwise reach the amplifier stage 20 by means of capacity coupling through the transformer, are drained off to ground through the electrostatic shield. A still further refinement in this respect may be had, if desired, by electrostatically isolating contacts 36, 36' from the driving coil 40 also through means of an electrostatic shield, as shown in Fig. 5.

Figure 3:
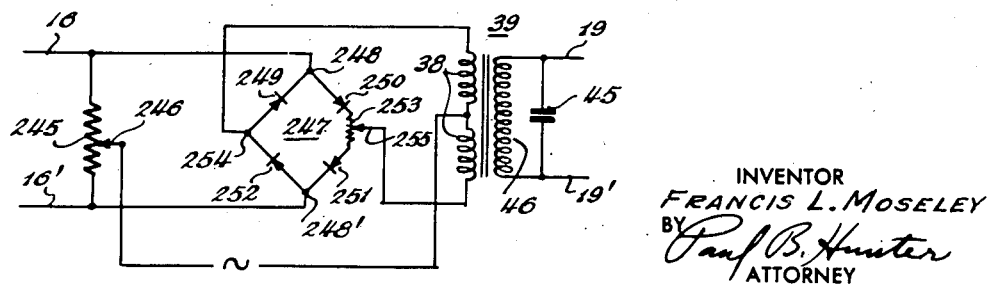
Fig. 3 is a wiring diagram of a modified form of the A. C. converter employed in Fig. 1.

In Fig. 3 a modified form of A. C. converter 17 is shown which requires no moving parts. The direct voltage servo signal in this case is applied directly across a potentiometer or tapped resistor 245, the adjustable contact arm 246 of which is connected to one side of a constant alternating current supply. The other side of the supply source is connected to the center tap of the two winding primary 38 of transformer 39.

The direct voltage signal is also employed as the control bias voltage of ring modulator 247 by being applied across input terminals 248, 248'. Ring modulator 247 consists of rectifiers 249, 250, 251, and 252 connected to form a bridge circuit. An adjustable resistor 253 is also included within the bridge circuit by being connected between rectifiers 250 and 251. The output voltage of the ring modulator appears between terminal 254 and the movable contact arm 255 of resistor 253. This output voltage is then applied across the opposite terminals of the primary winding 38 of output transformer 39. As before, a condenser 45 is connected across the secondary winding 46 to form a parallel resonant circuit tuned to the frequency of the source to thereby improve the wave form of the output signal voltage appearing across leads 19, 19'.

When the control bias voltage for the modulator 247 is zero, that is, when zero direct voltage servo signal is received across leads 16, 16', the four rectifiers of the bridge have equal resistance. In such a case, it will be apparent that equal and opposite currents will be permitted to flow through the two windings 38 of the output transformer and no alternating output voltage signal will be produced. Receipt of a direct voltage signal of one polarity across the control terminals 248, 248' of the modulator, however, serves to bias rectifiers 249 and 252 in a conducting direction and to bias rectifiers 250 and 251 toward cut-off. In this way, more current will be permitted to flow through the upper winding than the lower winding of the primary 38. This excess current will produce a proportional magnetic flux in the secondary of output transformer 39 resulting in an alternating voltage output signal appearing across output leads 19, 19' of a phase corresponding to the polarity of the direct voltage received. Receipt of an opposite polarity direct voltage reverses the biasing of the rectifiers, thereby permitting greater current flow in the lower winding of primary 38 and producing an opposite phase output alternating voltage. By proper adjustment of variable resistors 245 and 253, the converter will thus operate to produce across output leads 19, 19' an alternating voltage proportional in magnitude and corresponding in phase to the magnitude and polarity of the direct voltage received across input leads 16, 16'.

The amplifier stage 20 of Fig. 1 is shown in Fig. 2 as consisting of two preliminary amplifiers 49, 50 and a final push-pull amplifier 51, the two tubes of which feed the two sides of a center tapped primary winding 52 of output transformer 53. Conventional amplifiers and their associated circuits are shown in Fig. 2 for purposes of illustration although any suitable amplifying circuits could be employed. A tuning condenser 54 is shown connected across opposing terminals of primary winding 52 of output transformer 53. Thus, there is provided across output leads 22, 23 of the secondary winding 56 of the output transformer an alternating voltage proportional to the alternating voltage appearing across leads 19, 19'. This voltage is applied across one winding 57 of two phase motor 21, the other 90 degree phase displaced winding 58 of which is actuated from winding 41 of the supply transformer 42. By proper choice of condensers 45 and 54 and the inter-stage coupling components of the various amplifying circuits, a phase shift may be produced in the amplifier stage such as to cause the output voltage appearing across leads 22, 23 and applied to one winding 57 of motor 21 to have a 90 degree phase displacement with respect to the supply voltage applied across the other winding 58 of the motor.

As previoulsy stated, the output voltage appearing across leads 22, 23, when applied to winding 57, will cause motor 21 to actuate lead screw 6 in such a direction as to cause pen 4 and contact arm 12 to move in the direction necessary to reduce the difference voltage appearing across leads 14, 14' to zero, and to eventually come to rest at a displacement proportional to the variable input voltage received on terminals 7, 7'.

The purpose of the rate circuit 15 is to cause accurate positioning of pen 4 in accordance with the variable input voltage received even when said input voltage is changing at a high rate, and to cause pen 4 to stop at its proper position without hunting or oscillation when the variable input voltage becomes constant. It will be apparent that should the input voltage start increasing at a high rate the effect of the rate circuit will be to apply an additional torque to motor 21 proportional to this rate. In this way, any change in the input variable voltage is, in effect, anticipated by the rate circuit which operates to supply sufficient additional torque to the motor 21 to overcome its inherent inertia.

When the input variable voltage stops increasing and reaches a constant value, the pen 4 will approach this value, thus decreasing the difference voltage appearing across leads 14, 14'. Were the rate circuit omitted, the pen would not stop when the difference voltage reached zero, that is, when the pen reached its proper value, but would over-shoot. However, the effect of the rate circuit is to decrease the signal voltage applied to the motor by an amount proportional to the rate at which the pen 4 is approaching its proper value so that the pen will be slowed down to a gradual approach to its proper value. If the approach is made at a sufficiently high speed, the output voltage of the rate circuit, appearing across leads 16, 16', will actually reverse, as previously explained, to thereby actually apply a braking force on the motor.

The apparatus thus far described with respect to Fig. 2 for controlling the position of pen 4 in accordance with the input variable voltage received on input terminal 7, 7', that is the abscissa of the curve plotted on graph paper 3, is duplicated to control the angular position of the drum 1 in accordance with the other input variable voltage to thereby plot the ordinate of the curve. A resistor 10', corresponding to resistor 10, is shown as having a movable contact element 12', corresponding to movable contact element 12, actuated in accordance with the angular displacement of the drum 1. The drum is shown as rotated by a two phase motor 21' which is controlled in a manner similar to the above described control of motor 21.

Figure 4:
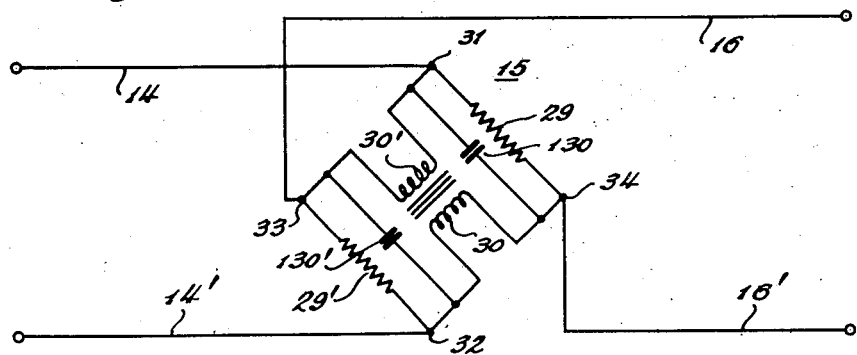
Fig. 4 is a wiring diagram of a modified form of the rate circuit used in Figs. 1 and 2.

Fig. 4 shows a modified form of the rate circuit 15 of Figs. 1 and 2. In this embodiment condensers 130, 130' are connected in parallel across resistors 29, 29', respectively. The effect of these condensers is to still further increase the component of voltage, appearing on output leads 16, 16', which is proportional to the rate of change of the difference voltage appearing across input leads 14, 14'. When the input voltage applied to the rate circuit is increasing, the impedance across resistors 29, 29' is effectively lowered by the shunting effect of condensers 130, 130'. This effective decrease in impedance between points 32 and 33 and points 31 and 34 increases the transmission efficiency of the bridge circuit to thereby further increase the output voltage appearing across leads 16, 16'. Under conditions of declining input voltage applied to the rate circuit, the stored energy in the condenser causes a current to flow in opposition to the applied signal voltage thus effectively increasing the effective impedance across resistors 29, 29', decreasing the transmission efficiency of the bridge circuit, and decreasing the output voltage produced across leads 16, 16'.

In Fig. 5 there is shown a further modified form of the invention. A slightly different voltage dividing circuit 8 is formed of tapped resistor 126 and resistor 131. In this case various portions of resistor 126 can be inserted in series with resistor 131 by connecting switch 132 to various taps 27 of resistor 126, as controlled by the setting of the sensitivity control knob. Resistor 131 and that portion of resistor 126 which is in the circuit are connected in series across the input terminals 7, 7'. The output leads 9, 9' of the voltage divider 8 are connected across the terminals of resistor 131. It will be apparent that the output voltage developed across resistor 131 will be dependent upon the amount of resistance 126 which is connected in the circuit and will therefore be dependent upon the setting of the sensitivity control knob.

In the modification shown in Fig. 5 provision is made for receiving both positive and negative values of the input variable voltage and for shifting the point on graph 3 which crresponds to zero voltage to the center of the graph paper, thus providing the "zero-center" mode of operation of the apparatus. For this purpose an additional center tapped resistor 133 is also connected across battery 28 and provision is made, as by switch 134, for connecting lead 9 to the center terminal of this resistor. Thus, when switch 134 is in its zero-center position, a zero balancing voltage will be produced between input lead 9 and contact arm 12 when the contact arm is in its central position and the pen is at the center of the graph paper. A positive or negative balancing voltage will be produced as the pen moves in one direction or the other from its central position on the graph paper. When switch 134 is in its "zero-left" position, operation is identical to that described for Fig. 2.

A modified form of rate or non-hunting circuit is also shown in Fig. 5. In this case, instead of obtaining a difference voltage and then modifying the difference voltage in a rate circuit, as was done in the Figs. 1 and 2, the balancing voltage itself is first modified in a rate circuit, and the output of the rate circuit is then employed as a new balancing voltage to be subtracted from the input voltage, received on leads 9, 9', to produce the total servo signal voltage across leads 16, 16'.

The rate circuit in this case consists of a parallel circuit arrangement of resistor 135 and condenser 136, one side of which is electrically connected to movable contact arm 12 and the other side of which is connected to the output lead 16. Output lead 16 is also connected to input lead 9 through resistor 137 which introduces the new rate modified polarity balancing voltage. Resistor 135 is preferably made of the order of nine times that of resistor 137 so that under steady state conditions, that is, when contact arm 12 is stationary, the actual balancing voltage introduced is about one-tenth of that developed between lead 9 and contact arm 12.

The effect of this rate circuit is mainly to prevent over-running and oscillation about the proper position of the pen and contact arm 12. Thus, if it be assumed that the pen and contact arm are approaching thier proper position at a substantial rate in such a direction that the balancing voltage appearing between lead 9 and contact arm 12 is increasing, condenser 136 will be in a circuit of changing potential and will draw a charging current. This charging current will of necessity flow through resistor 137 thus increasing the balancing voltage introduced over that which would have been introduced for the same position of contact arm 12 were the pen not moving. Another way of looking at this is that under such conditions of changing voltage applied to the rate circuit 15, condenser 136 provides a shunt across resistor 135 thus lowering its effective resistance and increasing the proportion of the voltage drop assumed by resistor 137. Thus, the balancing voltage introduced and subtracted from the input voltage received on leads 9, 9', will be greater by an amount depending upon the rate at which the pen and contact arm 12 are approaching their proper position. Accordingly, the servo signal voltage, appearing across output leads 16, 16', will be lower by a corresponding amount, thus decreasing the speed of the motor and allowing it to gradually approach its proper position. In this case also, should the pen approach its proper position at a sufficiently high rate of speed, the effect of the rate circuit can be great enough to actually reverse the polarity of the servo signal voltage appearing across leads 16, 16', to thereby actually apply a braking torque to the motor.

The output voltage appearing across leads 16, 16' is then applied to the A. C. converter 17, as in the previous figures. The static shield previously referred to for isolating contacts 36, 36' from driving coil 40 is schematically shown at 138 and grounded at 139. A different form of amplifier stage 20, having an interstage coupling and employing a phase inverter, is shown in this figure to illustrate another conventional method of amplifying the servo signal voltage appearing across leads 19, 19'.

Figure 6:
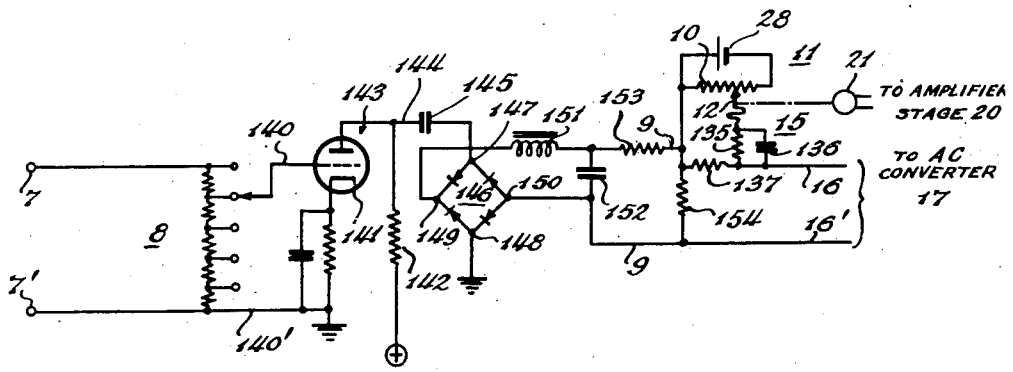
Fig. 6 is a wiring diagram of an automatic recorder adapted to record A. C. inpjut signals linearly.

The previous modifications of the invention are all adapted to operate from direct voltage input signals. In Fig. 6, an arrangement is shown wherein the recorder is adapted to receive and record variable input signals of alternating voltages which may have frequencies extending over a wide range. In this form of the invention the zero-left mode of operation is employed so that the pen is instantaneously displaced from its leftmost position by an amount proportional to the magnitude of the alternating input voltage received.

In this case a variable magnitude input alternating voltage is applied across input terminals 7, 7'. A voltage divider 8, identical to that shown in Fig. 2, is employed to adjust the sensitivity of the device and to obtain, across output leads 140, 140', an alternating voltage proportional to the input voltage and having a magnitude within the range for which the remainder of the system is designed. This voltage, appearing across leads 140, 140', is amplified in a suitable electron tube amplifier circuit 143 by connecting lead 140 to the grid of tube 141 and connecting lead 140' to a grounded point in the cathode circuit of the tube. A constant source of plate supply voltage is provided, the positive side of which is connected to the plate of tube 141 through resistor 142. Obviously any number of amplifier stages may be employed, if desired, to meet specific types of operating conditions.

The output voltage of the amplifier circuit 143, appearing between output lead 144 and ground, is connected through coupling condenser 145 to a bridge type rectifier 146, where it is applied across input terminals 147, 148. Rectifier 146, which may be of any conventional type, is adapted to produce across its output terminals 149, 150 a direct voltage proportional in magnitude to the alternating voltage applied to input terminals 147, 148. A smoothing circuit, consisting of a choke coil 151, and a condenser 152, is employed to smooth out the output of rectifier 146 and provide a more constant direct voltage across output leads 9, 9', which leads are connected to opposite sides of condenser 152.

This rectified direct voltage appearing across leads 9, 9' is then applied to a voltage dividing circuit consisting of series connected resistors 153, 154. Accordingly, there is produced across leads 9, 9' a direct voltage having a magnitude proportional to the alternating input voltage received on terminals 7, 7'. The purpose of the voltage dividing circuit, consisting of resistors 153, 154, is to insure the operation of rectifier 146 at a relatively high level, it being well known that rectifiers as a class tend to be non-linear when operated at low levels.

The remainder of the apparatus of Fig. 6 is shown as identical to that of Fig. 5 when operating as a zero-left recorder. Accordingly, the pen will always be displaced from its left-most position by an amount proportional to the magnitude of the input alternating voltage applied across terminals 7, 7'. This mode of operation will be referred to as "A. C. linear" operation.

Figure 7:
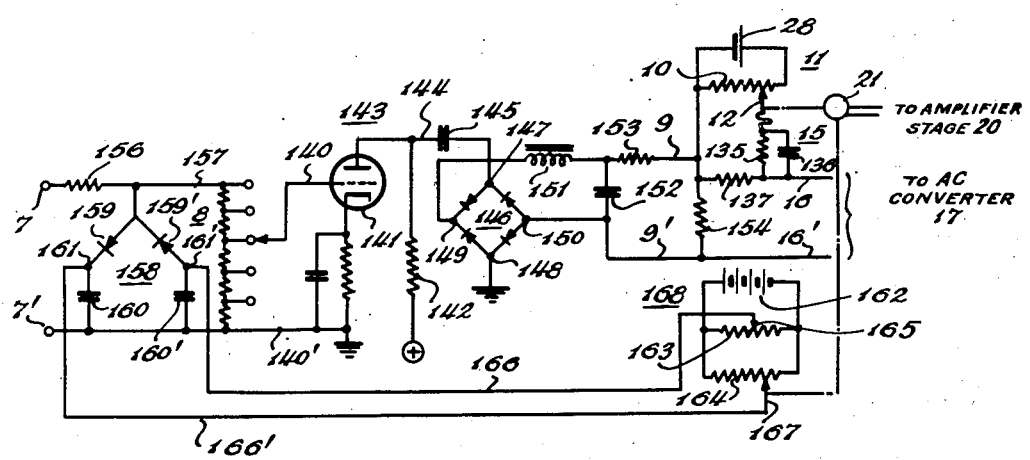
Fig. 7 is a wiring diagram of an automatic recorder adapted to record A. C. input signals on a logarithmic scale.

In some applications of the recorder of the present invention it is desirable to record exponentially varying inputs on a linear scale, in which case the recording paper could be calibrated in decibels, for example. For such a purpose, it is necessary that the pen be displaced from its zero position by an amount proportional to the logarithm of the variable input voltage received on the input terminals. A circuit arrangement for accomplishing this type of operation is shown in Fig. 7. In this form of the invention, the recorder is adapted to receive alternating input voltages, and the pen is adapted to operate from an extreme instead of a central zero position. This type of operation will be termed "A. C. log" operation.

As before, the alternating input voltage is applied across input terminals 7, 7' and is then introduced into a voltage dividing circuit 8. A dropping resistor 156 in this case is inserted between input terminal 7 and the voltage divider 8. From the voltage divider 8 on through to the motor 21 the apparatus and the operation thereof is identical with that shown in Fig. 6 so that the pen is displaced from its zero position by an amount proportional to the magnitude of the alternating voltage applied across the input terminals of the voltage divider 8.

In order to make the voltage applied to the input terminals of the voltage divider 8 proportional to the logarithm of the input voltage received on input terminals 7, 7', a controllable shunt 158 is connected between leads 157, 140', the controllable shunt consists of two parallel paths, one path consisting of a biased rectifier 159 in series with a condenser 160, and the other path consisting of a similar biased rectifier 159' in series with a condenser 160'. The impedance presented by shunt 158 across leads 157, 140' may be varied by varying the direct control bias voltage applied to points 161, 161', intermediate condenser 160 and rectifier 159, and condenser 160' and rectifier 159', respectively. It will be apparent that by varying the effective impedance of shunt 158, the total impedance between leads 157 and 140' can be varied, thus determining the voltage drop across resistor 156. In this way the proportion of the input voltage, received on terminals 7, 7', which appears across the input terminals of voltage divider 8, may be controlled by the direct control voltage applied to points 161, 161' of variable shunt 158.

This control voltage is obtained from a potentiometer arrangement 168 energized from a constant source of direct potential, indicated as a battery 162. Two resistors 163 and 164 are connected across the terminals of battery 162. Point 161' is connected directly to a point 165 on resistor 163, as by lead 166. Point 161 is connected, as by lead 166', to a movable contact arm 167, which makes contact with resistor 164, and which is schematically indicated as actuated from motor 21 in accordance with the pen position. In this way a control bias voltage is obtained for controllable shunt 158 which is determined by the actual instantaneous pen position.

In operation, it will first be assumed that a very low input voltage is being received on input terminals 7, 7', and that accordingly the pen is near its zero position and contact arm 167 is in a corresponding position. Under such conditions, by proper design of the controllable shunt 158 and potentiometer 168, the control bias voltage appearing across leads 166, 166' can be made to have such a value that the variable shunt 158 is substantially an open circuit. Accordingly, the greatest possible proportion of the input voltage received is applied to the terminals of the voltage divider 8.

Now as the input voltage becomes larger and the remainder of the circuit responds, as previously described, to attempt to correspondingly increase the displacement of the pen from its zero position, the control voltage changes by virtue of the changed position of contact arm 167. This change in the control voltage will be in such a direction as to decrease the effective impedance of variable shunt 158 thus increasing the attenuation of the input voltage received, and decreasing the proportion of the input voltage which is applied to voltage divider 8. Accordingly, this voltage will be capable of being balanced out by a lower balancing voltage than would otherwise be the case, and the pen will stop before it reaches a position which is truly proportional to the input voltage received on terminals 7, 7'. It will be apparent that the actual relationship between the final position of the pen and the input voltage received on terminals 7, 7' will depend upon the characteristics of both the variable shunt 158 and the potentiometer unit 168. By suitable design of the variable shunt 158 and by suitable design of the winding of resistor 164, together with a suitable choice of tapping point 165 for resistor 163, the desired logarithmic relationship may be obtained so that the pen will assume a position proportional to the logarithm of the input alternating potential received on terminals 7, 7.

In Figs. 5, 6 and 7 four distinct modes of operation of the two-axes recorder of the present invention have been described. In Fig. 5, the modes of operation designated as "D. C. zero-center" and "D. C. zero-left" are selectively effective depending upon the position of switch 134. In Fig. 6, "A. C. linear" operation has been described, and in Fig. 7 "A. C. log" operation has been described. In Fig. 8, there is shown a suitable switching arrangement whereby all of these four modes of operation may be obtained in a single two-axes recorder with a minimum duplication of apparatus.

A multiple gang switch 170 is provided having three similar sections 171, 172, and 173, each consisting of eight fixed terminals T, and two electrically insulated movable contact arms C oppositely disposed with respect to each other so as to make simultaneous contact with diametrically opposed ones of the terminals T. The position of the several contact arms C are simultaneously controlled by a knob 174 which is placed in any one of the four marked positions to obtain the desired mode of operation.

The variable input voltage is applied across input terminals 7, 7' as in the preceding figures. By following through the circuits associated with switch section 171, it will be apparent that when switch 170 is in either the "D. C. zero-left" or "D. C. zero-center" position, the input voltage is connected between lead 9' and the left-hand end of voltage divider 8. A predetermined percentage of this voltage is then attained across the output leads 9, 9' of the voltage divider 8, as in Fig. 5.

Referring back to Fig. 5 for the moment, it will be recalled that when switch 134 is in its left position, contact is made between lead 9 and the midpoint of resistors 133 of balancing circuit 11 to thereby provide "D. C. zero-center" mode of operation, whereas when switch 134 is in its right-hand position, lead 9 is connected to the left-hand terminal of resistor 10 of balancing circuit 1 to thereby provide "D. C. zero-left" mode of operation. A similar switching operation is performed in Fig. 8 by the upper portion of section 172 of switch 170. Thus, it will be seen that through this portion of the switch a circuit is made between the lead 9 and the left-hand side of resistor 10' when switch 170 is in its "D. C. zero-left" position, whereas when switch 170 is in its "D. C. zero-center" position, lead 9 is connected to a point intermediate resistors 133. Thus, the upper portion of section 172 of switch 170 provides an identical switching operation to that provided by switch 134 of Fig. 5. As in Fig. 5, rate circuit 15 operates to modify the voltage across leads 9, 9' by an amount proportional to the rate of change of that voltage, and the output of the rate circuit, appearing across leads 16, 16', is then introduced into the A. C. converter 17, which may also be identical to that shown in Fig. 5. It will be understood that the remaining portion of the apparatus of Fig. 8 which is necessary to displace the pen 12 by an amount proportional to the voltage appearing across leads 9, 9', is identical to that shown in Fig. 5. Thus, the apparatus of Fig. 8 operates to selectively provide "D. C. zero-center" and "D. C. zero-left" modes of operation when switch 170 is in the corresponding position.

It will be recalled that in Fig. 6, wherein apparatus for producing "A. C. linear" mode of operation was described, the alternating input signal voltage was first converted to a corresponding and proportional direct voltage, which was then employed in a manner identical to that employed in Fig. 5 for "D. C. zero-left" mode of operation. Accordingly, in Fig. 8, when switch 170 is in its "A. C. linear" or "A. C. log" positions, the input voltage applied across terminals 7, 7', which is now, of course, an alternating voltage, is connected through section 171 of switch 170 to a second voltage divider 8', terminal 7 being connected by the switch through resistor 156 to lead 157, through the voltage divider 8' to grounded lead 140', and thence back to terminal 7' through the switch. Rectifying apparatus, identical to that employed in Fig. 6, is provided to obtain a direct voltage across opposite terminals of condenser 152 corresponding to the alternating voltage appearing across leads 140, 140', this rectifying apparatus consisting initially of vacuum tube circuit 143 and the rectifier bridge circuit 146. The right-hand terminal of condenser 152 is connected through section 173 of switch 170, through the resistor 153', and then to lead 9, when switch 170 is in the "A. C. linear" and "A. C. log" positions. Similarly, in these switch positions, the left-hand terminal of condenser 152 is connected through the switch directly to lead 9'. Resistors 153' and 154' operate to further divide the voltage across the terminals of condenser 152 so that only a predetermined percentage of this voltage is applied across leads 9, 9', thus performing the same function as resistors 153 and 154 of Figs. 6 and 7, namely to improve the over-all operation of rectifier 146. The remainder of the apparatus then operates on the direct voltage appearing across leads 9, 9' in the same manner as for "D. C. zero-left" mode of operation, it being seen that lead 9 is connected through the upper portion of section 172 of switch 170 to the left-hand terminal of resistor 10' in both the "A. C. linear" and the "A. C. log" positions of the switch as required for zero-left operation. Thus, when switch 170 is in its "A. C. linear" position connections are made which are identical to the connections shown in Fig. 6 which produce that type of operation.

When switch 170 is in its extreme left, or "A. C. log" position, the alternating voltage applied to terminals 7, 7' is plotted on the graph paper to a logarithmic scale in a manner identical to that described with respect to Fig. 7. Referring back to Fig. 7, it will be recalled that the only difference between the circuit of Fig. 7 for "A. C. log" operation and the circuit of Fig. 6 for "A. C. linear" operation was that in order to obtain "A. C. log" operation, a variable shunt 158 was provided across leads 157 and 140', which leads were connected to the opposite terminals of the voltage divider 8', and this variable shunt was controlled from the output voltage of a potentiometer unit 168, appearing across leads 166 and 166'. Similarly, in Fig. 8, an identical variable shunt 158 is connected across leads 157 and 140' when switch 140 is in its "A. C. log" position. Thus, it will be seen that when the switch is in this position, the upper terminal 175 of the variable shunt 158 is connected through the lower portion of section 172 of the switch to lead 157. The lower terminals of condenser 160 and 160' of the variable shunt are connected directly to ground and to terminal 140', also as in Fig. 7. The potentiometer unit 168, having its variable contact arm 167 controlled in accordance with the position of the pen 12, is provided in order to produce an output voltage across the leads 166 and 166' which operates to control variable shunt 168 by being connected to terminals 161' and 161, respectively. Thus, in the "A. C. log" position of switch 170 the circuits of Fig. 7 are duplicated to thereby provide the desired "A. C. log" mode of operation.

It will be understood that contact arms 132 and 140 of voltage dividers 8 and 8', respectively, may be connected together to be operated synchronously from a single sensitivity control knob.

In Figs. 9 and 10 there is shown additional apparatus which may be provided in order to employ the indicator as a control device for one or both of the physical quantities represented by the variable voltages applied and recorded on the graph. Although the apparatus may be employed to record and control any physical quantity at all, for purposes of illustration in Fig. 9 it is assumed that the physical quantity, which is being plotted as the ordinate on graph paper 3, is temperature, it having been first converted to a corresponding A. C. or D. C. voltage and applied to the input terminals for the ordinate. In accordance with the previously described principles of operation of the invention, therefore, the angular displacement of drum 1 will be proportional to the temperature to be recorded and controlled.

The temperature is controlled by a furnace (not shown), the gas or fuel flow to which is controlled by a valve 176 which is connected through suitable gearing 177 to a motor 178. Motor 178 is of the series field type and has the left-hand terminal of its armature connected directly to one side of a constant source of direct potential, as by lead 179. The right-hand terminal of the armature of motor 178 is connected through one or the other of the series field windings 180 and 181, through a switching arrangement mounted on drum 1, and back to the positive side of the direct voltage source, as by lead 182. Field windings 180 and 181 are so connected that when field winding 180 is energized motor 178 is caused to rotate in one direction to increase the gas flow to the furnace to thereby increase the temperature. Conversely, upon energization of field winding 181 motor 178 is caused to turn in such a direction as to decrease the temperature of the furnace. The switching arrangement associated with drum 1 is schematically indicated in Fig. 9 and mechanically illustrated in more detail in Fig. 10.

Referring to Fig. 9, a contact element 188 is fixedly mounted on drum 1 and is connected through terminal 186 to one side of the power supply. A circular gear ring 189 is pivotally mounted about the axis of drum 1 and contains two electrically insulated contact plates 190, 190'. Contact plates 190, 190' are arranged to make a sliding contact with contact element 188. A setting knob 191 is provided in order to control the position of the gear ring 189 and contact plates 190, 190' through the small gear 192.

In operation setting knob 191 is adjusted until the spacing between contact plates 190, 190' takes a position with respect to drum 1 which corresponds to the desired temperature as indicated by the graduations on the drum. If the actual temperature does not correspond to this desired temperature, the contact element 188 fixed to the drum will not coincide with the spacing between plates 190, 190', but rather will make contact with one or the other of the plates depending on whether the temperature is higher or lower than the desired temperature as set on knob 191. If the actual temperature is higher, contact element 188 will be connected with contact plate 190' thereby providing a direct circuit through field winding 181 to the negative side of the power supply. Energization of this winding causes the motor to operate the valve to decrease the flow of gas to the furnace to thereby decrease the temperature. As the temperature decreases, the drum 1 and the contact element 188 will move into coincidence with the spacing between contact plates 190, 190'. Similarly, if the temperature is lower than the desired temperature, contact element 188 will engage contact plate 190 to thereby energize the opposite field winding and cause the temperature to increase. In this way, the temperature is controlled at substantially the value set in on knob 191 varying therefrom only within a range determined by the spacing between contact plates 190, 190'. This spacing may be designed to provide as narrow or as broad a range of deviation from the set-in temperature condition as is desired.

In Fig. 10 a possible mechanical construction of the switching arrangement schematically indicated in Fig. 9 is shown. Contact plates 190, 190' take the form of a slip ring with sliding contacts 193 and 194, respectively, connecting these plates to terminals 185 and 187. A slip ring 195 is fixedly mounted on drum 1 and is connected to terminal 186 through a sliding connection 196. Contact element 188 is mounted on, and electrically connected to, slip ring 195 and comprises a sliding contact for engaging slip rings 190 and 190'.

A similar control may obviously be applied to the physical quantity, which is represented by the voltage applied to the abscissa terminal 7, 7', and which is being duplicated as a proportional lateral movement of the pen 4 and recorded as the abscissa on graph paper 3.

Referring now to Fig. 11, there is shown the actual external form which an automatic two-axis recorder embodying the foregoing principles may assume. 200 indicates generally a chassis within which the apparatus of Figs. 8 and 10 are contained. The face 201 of the chassis is shown inclined and contains a glass window 202 through which the drum 1 and pen 4 may be viewed. Doors 203 are provided in order to obtain easy access to the enclosed circuits for servicing. A drawer 204 may be employed to keep tools and accessories. A lead-in plug 206 provides the alternating current power supply for the recorder.

On the middle portion of the face 201 there is located the input terminals 7, 7' and 205, 205' to which the variable input voltages signals to be recorded as the abscissa and the ordinate, respectively, are connected. The upper portion of the face 201 contains the terminals 185, 186, and 187 and the setting knob 191 of the automatic control apparatus of Figs. 9 and 10 for controlling the external condition which is being recorded as the ordinate on the graph to any desired value set on the knob. A similar setting knob 191' and set of terminals 185', 186', and 187' are associated with the abscissa. It will be understood that only that portion of the automatic control system which is shown in Fig. 10 is included within the chassis 200, the other portion being external thereto.

The control panel for the recorder itself is located at the bottom of the face 201 and is more fully shown in Fig. 12. The desired mode of operation is obtained by setting knobs 207, 207' for the abscissa and ordinate, respectively, to their appropriate positions. Sensitivity control knobs 208, 208' for the abscissa and ordinate, respectively, may be set to the required position to adapt the recorder to the particular magnitude of input signal voltages which are available. As shown, a range from 5 millivolts to 500 volts is readily obtainable by proper design of the interior circuits. It will be understood that by adjusting the sensitivity control knob 208, the position of both the movable arms 132 and 140 of voltage dividers 8 and 8', respectively, of Fig. 8 are controlled. Actually resistors 8, 8' are provided with 11 taps instead of 5, as illustrated in Fig. 8, one for each of the possible positions of control knob 208. Control knob 208' similarly controls the corresponding voltage divider for the ordinate.

In Figs. 13 to 16, there are illustrated several applications for which the automatic recorder of the present invention is particularly adapted. In Fig. 13, the automatic recorder 200 is shown as it might be employed to obtain a gain-frequency curve of any type of apparatus under test 210, such as an amplifier. A variable frequency oscillator 211 is provided for applying a varying frequency voltage signal through a suitable attenuator 212 to the input terminals of the apparatus under test 210. A motor 213 actuates the frequency control adjustment of oscillator 211 in order to provide a continuously changing frequency over the frequency range for which the frequency-gain curve is to be plotted. The motor is not necessary, of course, since the frequency could be manually controlled if desired. There is thus applied to the apparatus under test a constant magnitude alternating current of variable frequency.

The output of the apparatus under test will instantaneously be of the same frequency as the input but its magnitude will depend at any instant upon the gain of the apparatus for that particular frequency. Accordingly, the output terminals of the apparatus under test are connected directly to the abscissa terminals 7, 7' of the recorder to thereby record the magnitude of the output of the apparatus under test as the abscissa of the curve.

The output terminal of the apparatus under test is also applied to a frequency indicator circuit 214 of any conventional type adapted to produce an output voltage having a magnitude proportional to the applied frequency. The output of the frequency indicator circuit 214 is then connected to the ordinate terminals 205, 205' of the recorder 200 to thereby record, as the ordinate, the frequency corresponding to the magnitude recorded as the abscissa.

There is thus obtained on the graph paper of the recorder a plot of the gain-frequency characteristics of the apparatus 210 which is under test. Probably, it would be desirable to employ the "A. C. log" mode of operation in this application so that the frequency and the gain would both be recorded linearly for logarithmic variations, the gain thereby reading directly in decibels.

In Fig. 14, there are illustrated the connections necessary to obtain a family of plate current-grid bias curves for a vacuum tube, shown as pentode 215. A uniformly varying grid bias voltage is obtained from the potentiometer 216 which is constantly energized by battery 217, and the moving contact arm 218 of which is actuated from motor 219 through the lead screw 220 and the nut 221. There is thus obtained across output leads 222, 223 a uniformly varying voltage which is applied as the grid bias between the cathode and grid of tube 215. This grid bias voltage is also applied directly to the abscissa terminals of recorder 200, as by leads 224, 225.

The plate current of the tube flows in series through the plate supply battery 226, a shunt resistor 227, connected, as by leads 229, 230, across the ordinate terminals of the recorder, and a variable plate load 228. The plate current is thus converted to a proportional voltage signal across resistor 227 and is recorded as the ordinate on the graph paper. Accordingly, a curve is obtained on the graph paper of the plate current of tube 215 plotted against the grid bias voltage. Plate supply battery 226 and the screen grid supply battery 231 may be tapped as shown so that a whole family of such curves may be quickly obtained for various plate supply and screen grid voltages.

Fig. 15 shows a modification of Fig. 14 wherein the automatically varying grid bias voltage is obtained in a different manner. In this case the movable contact arm 218', instead of being driven by motor 219, is initially manually adjusted to the maximum grid bias voltage which it is desired to record. This contact arm is connected through a switch 232 to the grid of tube 215, indicated as a triode in this case. Lead 222 is connected directly to the cathode of the tube, as before. Also connected in parallel between the grid and cathode of the tube are a resistor 233 and a condenser 234.

In operation, the contact arm 218' is adjusted to the maximum desired grid bias voltage with switch 232 closed. The condenser becomes charged to this maximum voltage and applies this voltage to the grid of the tube. The recorder 200 is then placed in operation and switch 232 is opened. The condenser slowly discharges through resistor 233 thereby gradually reducing the grid bias voltage to zero.

In Fig. 16 there is illustrated the application of the recorder for obtaining the speed-torque characteristics of an engine or motor. 235 indicates the engine under test. The engine is connected to drive a cradle type dynamometer 236 which provides an indication of the engine torque as an angular displacement of its output member 237. Output member 237 is employed as the movable contact arm of a potentiometer 240, the opposite terminals of which are connected to a battery 241. Accordingly a direct voltage signal is obtained between one terminal of battery 241 and contact arm 237 which is proportional to the output torque of the engine, and this voltage signal is then applied to one set of terminals of the recorder, as by leads 242, 243, to thereby record the torque as one coordinate of the curve.

A small generator 238 is actuated from the engine shaft through a belt drive 239 to produce an output signal voltage proportional to the engine speed. This signal voltage is then connected to the other set of terminals of the recorder 200, as by leads 244, 245, to thereby record the engine speed as the other coordinate of the curve. Thus, by varying the engine speed by means of a throttle 246 a continuous speed-torque curve may be obtained on the graph paper.

The invention has been described as a two axis automatic recorder primarily adapted to obtain a curve of one external physical condition plotted against a second external physical condition. It will be understood, however, that the apparatus could be used, if desired, to record only one external physical condition as it varies with time. To accomplish this purpose either the pen or the drum could be released from the control of the input signal voltage, and, instead, could be continuously moved either by hand or automatically by a motor or clock mechanism. Another method would be simply to use the recorder as previously described, but to continuously change the magnitude of one of the variable input signal voltages from zero to a maximum value.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In apparatus of the character described, a control circuit and a servo drive operated therefrom, said control circuit comprising an adjustable voltage divider for receiving a variable signal voltage, a balancing circuit fed from said voltage divider, said balancing circuit having a source of voltage for opposing the signal voltage to produce a variable difference voltage dependent upon the operation of said servo drive, a rate-taking circuit connected for receiving said difference voltage and for deriving a rate voltage therefrom, and a converter connected for converting said difference voltage and said rate voltage into an alternating servo voltage of variable magnitude and reversible phase in dependence upon said signal voltage, said servo drive being connected to be controlled by said servo voltage, said rate-taking circuit comprising a Wheatstone bridge network having in each of its two parallel branches an inductance with the inductances mutually coupled for transformer action.

2. Recording apparatus of the character described, comprising a source of signal voltages to be recorded, a recorder having a movable recording member, a motor for operating said member, means to produce a local balancing voltage in accordance with the position of said member, a balancing circuit for balancing said signal voltage against said local voltage to produce a differential voltage, a rate circuit for producing a control voltage responsive to the magnitude and rate of change of said differential voltage, a converter arrangement for converting said control voltage into a corresponding variable magnitude and reversible phase alternating current voltage, means to apply said alternating current voltage to control said motor to move said member to produce a balance between said signal voltage and said local voltage, said rate circuit comprising a Wheatstone bridge network having an inductance in each of its two parallel branches, said inductances being mutually coupled for transformer action, said Wheatstone bridge network having two of its conjugate points connected to said balancing circuit and the other two conjugate points connected to said converter.

FRANCIS L. MOSELEY.

REFERENCES CITED

The following references are of record in the file of this patent:

UNITED STATES PATENTS

| Number | Name | Date |
| --- | --- | --- |
| 1,685,973 | Alexander | Oct. 2, 1928 |
| 1,788,127 | Sparkes | Jan. 6, 1931 |
| 2,150,006 | Parker et al | Mar. 7, 1939 |
| 2,166,932 | Keinath | July 25, 1939 |
| 2,172,064 | Harrison | Sept. 5, 1939 |
| 2,176,013 | Pineo | Oct. 10, 1939 |
| 2,203,689 | MacDonald | June 11, 1940 |

(Other references on following page)

UNITED STATES PATENTS

| Number | Name | Date |
|---|---|---|
| 2,208,623 | Bond | July 23, 1940 |
| 2,228,883 | Morgan | Jan. 14, 1941 |
| 2,233,415 | Hull | Mar. 7, 1941 |
| 2,272,914 | Keeler | Feb. 10, 1942 |
| 2,297,543 | Eberhardt | Sept. 29, 1942 |
| 2,307,503 | Gulliksen | Jan. 5, 1943 |
| 2,316,240 | Harrison | Apr. 13, 1943 |
| 2,352,103 | Jones | June 20, 1944 |
| 2,367,746 | Williams, Jr. | Jan. 23, 1945 |
| 2,376,599 | Jones | May 22, 1945 |
| 2,385,447 | Jones | Sept. 25, 1945 |

FOREIGN PATENTS

| Number | Country | Date |
|---|---|---|
| 221,077 | Great Britain | Sept. 4, 1924 |